United States Patent
Borchers

(10) Patent No.: US 6,943,914 B1
(45) Date of Patent: Sep. 13, 2005

(54) COMPUTER, PRINTER AND SOFTWARE FOR CHANGING CONTROL OF PRINTER MARKING DEVICE WHILE PRINTING ON A SINGLE PAGE

(75) Inventor: Gregory E. Borchers, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 834 days.

(21) Appl. No.: 09/661,843

(22) Filed: Sep. 14, 2000

(51) Int. Cl.[7] .................................................. G06F 15/00
(52) U.S. Cl. ........................................ 358/1.6; 382/318
(58) Field of Search ....................... 358/1.1, 1.9, 1.13, 358/1.15, 1.16, 1.18, 518, 530, 448, 450, 358/453, 462, 1.4, 1.6, 486, 497; 382/176, 382/266, 276, 277, 294, 304, 318; 707/500, 707/522, 523, 911

(56) References Cited

U.S. PATENT DOCUMENTS

| 4,561,025 A | | 12/1985 | Tsuzuki ..................... 358/298 |
| 4,982,199 A | | 1/1991 | Dunn .......................... 346/1.1 |
| 5,225,911 A | * | 7/1993 | Buckley et al. ............. 358/296 |
| 5,333,246 A | | 7/1994 | Nagasaka .................... 395/133 |
| 5,642,142 A | | 6/1997 | Bohorquez ................... 347/15 |
| 5,687,303 A | * | 11/1997 | Motamed et al. ........... 358/1.18 |
| 5,704,021 A | | 12/1997 | Smith ......................... 395/109 |
| 5,854,886 A | | 12/1998 | MacMillan ................. 395/114 |
| 5,937,153 A | | 8/1999 | Gauthier ..................... 395/117 |
| 6,176,429 B1 | * | 1/2001 | Reddersen et al. ..... 235/462.25 |
| 6,327,043 B1 | * | 12/2001 | Rumph et al. .............. 358/1.15 |

FOREIGN PATENT DOCUMENTS

JP          09-030089          2/1997

OTHER PUBLICATIONS

JP09-030089 2/04/1997 English translation of Abstract.

* cited by examiner

Primary Examiner—Gabriel Garcia
(74) Attorney, Agent, or Firm—Marger Johnson & McCollom, P.C.

(57) ABSTRACT

A computer is provided, along with a printer and software. The software causes the computer to change control settings of a printer's marking device while printing on a single page. The computer prepares raster data blocks (RDB) of data for printing a single page. In addition, there are included interspersed raster control block (RCB) data for adjusting the settings of the marking device while printing on the page. While the RCB data is preferably presented between RDB data of different scan lines, the RCB data blocks can change the settings even when printing along a single scan line.

7 Claims, 5 Drawing Sheets

Fig. 5

| SCANLINE | RCB | | | RDB | | |
|---|---|---|---|---|---|---|
| X | RCB-XA | RCB-XB | RCB-XC | RDB-XA | RDB-XB | RDB-XC |
| Y | | RCB-YA | | | RDB-YA | |
| Z | RCB-ZA | RCB-ZB | | RDB-ZA | | RDB-ZB |

Fig. 6

| SCANLINE | RCB/RDB | | | | | |
|---|---|---|---|---|---|---|
| X | RCB-XA | RDB-XA | RCB-XB | RDB-XB | RCB-XC | RDB-XC |
| Y | RCB-YA | | RDB-YA | | | |
| Z | RCB-ZA | RDB-ZA | RCB-ZB | RDB-ZB | | |

COMPUTER, PRINTER AND SOFTWARE FOR CHANGING CONTROL OF PRINTER MARKING DEVICE WHILE PRINTING ON A SINGLE PAGE

BACKGROUND OF THE INVENTION

1. Field of the Invention

The present invention is related to the field of electronic printers, and more specifically to a computer, a printer and software for changing control settings of a printer's marking device while printing on a page.

2. Description of the Related Art

Electronic printers are used for printing on sheets of paper. A marking device of the printer is set once, for printing on a whole page. This can be a problem in certain situations, especially where different types of printing must be combined on the same page. The problem is exacerbated where a single sheet of paper has regions of different textures, where different settings of the marking device are optimum for printing on each texture. An example is now described.

Referring to FIG. 1, a page 10 has a first region 12 with a first type of texture, and a second region 14 with a second type of texture. The first texture of first region 12 is suited for printing text thereon, while the second texture of second region 14 is suited for printing a photograph thereon. The page 10 can be a special sheet for printing an individual's identification card.

Printers in the prior art define raster scan lines 22, 24 on the entire page 10. Only six such scan lines 22, 24, are shown, but that is only so as not to confuse the drawing. In fact many more are typically defined in a single page. It should be noted that scan lines 24 span only the first region 12, while scan lines 22 span both the first region 12 and the second region 14.

The problem is that the portions of scan lines 22 in the second region 14 appear not sharp, or smudged. That is because a marking device of the printer is set for marking according to what is optimum for the first texture of the first region 12. This setting is typically not also the optimum setting for marking on the second texture of the second region 14.

The problem is simply avoided in the prior art by processing the page 10 through the printer twice. First one prints only on the first region a number of similar pages, and then they eject the page. Then they reinsert the pages in the printer, and reset the marking device for optimum printing on the second region 14. The process is cumbersome, and reinsertion is subject to alignment errors.

The prior art uses a specific data structure (also known as data format) for printer ready data. Referring to FIG. 2, the prior art data structure 200 is described. This is data works with Printer Control Languages (PCLs) and Page Description Languages (PDLs) for printers such as raster printers and other types of printers.

Data structure 200 includes a data group 210 with job settings for marking device initialization. It also includes a data group 210 with job settings for marking device control codes. These are followed by data groups 230, 240, ..., 250 each of which has raster data for corresponding scan lines. Then follows a data group 260 with job settings for page eject and device reset.

According to data structure 200, the entire page is processed. The marking device moves according to all the raster scan line data, and then the page is ejected. A single setting of the marking device will have to suffice for the entire page.

BRIEF SUMMARY OF THE INVENTION

The present invention overcomes these problems and limitations of the prior art.

Generally, the present invention provides a computer, a printer and software for changing control settings of a printer's marking device while printing on a single page. The computer prepares raster data blocks (RDB) of data for printing a single page. In addition, there are included interspersed raster control block (RCB) data for adjusting the settings of the marking device while printing on the page. While the RCB data is preferably presented between RDB data of different scan lines, the RCB data blocks can change the settings even when printing along a single scan line.

The invention will become more readily apparent from the following Detailed Description, which proceeds with reference to the drawings, in which:

BRIEF DESCRIPTION OF THE DRAWINGS

FIG. 5 is a table showing a detail of a first embodiment of the data format of FIG. 4 for three sample scan lines.

FIG. 6 is a table showing a detail of a second embodiment of the data format of FIG. 4 for three sample scan lines.

DETAILED DESCRIPTION OF THE PREFERRED EMBODIMENT(S)

As has been mentioned, the present invention provides a computer, a printer and software for changing control settings of a printer's marking device while printing on a page. The invention is now described in more detail.

Figure 1:
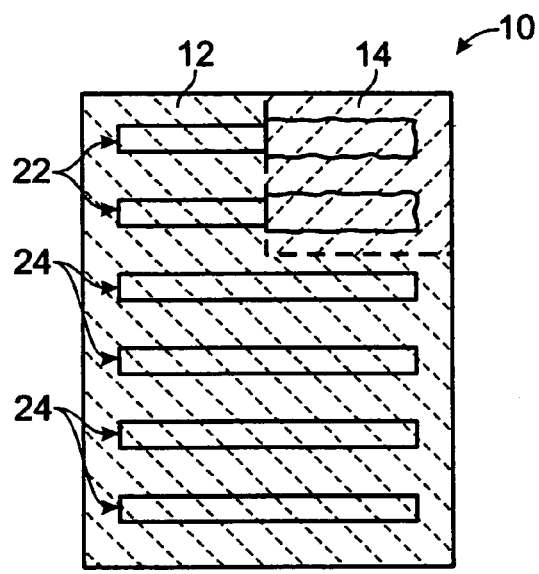
FIG. 1 is a depiction of a sheet of paper having two regions of different surface textures, that has been printed on according to methods in the prior art.
Figure 2:
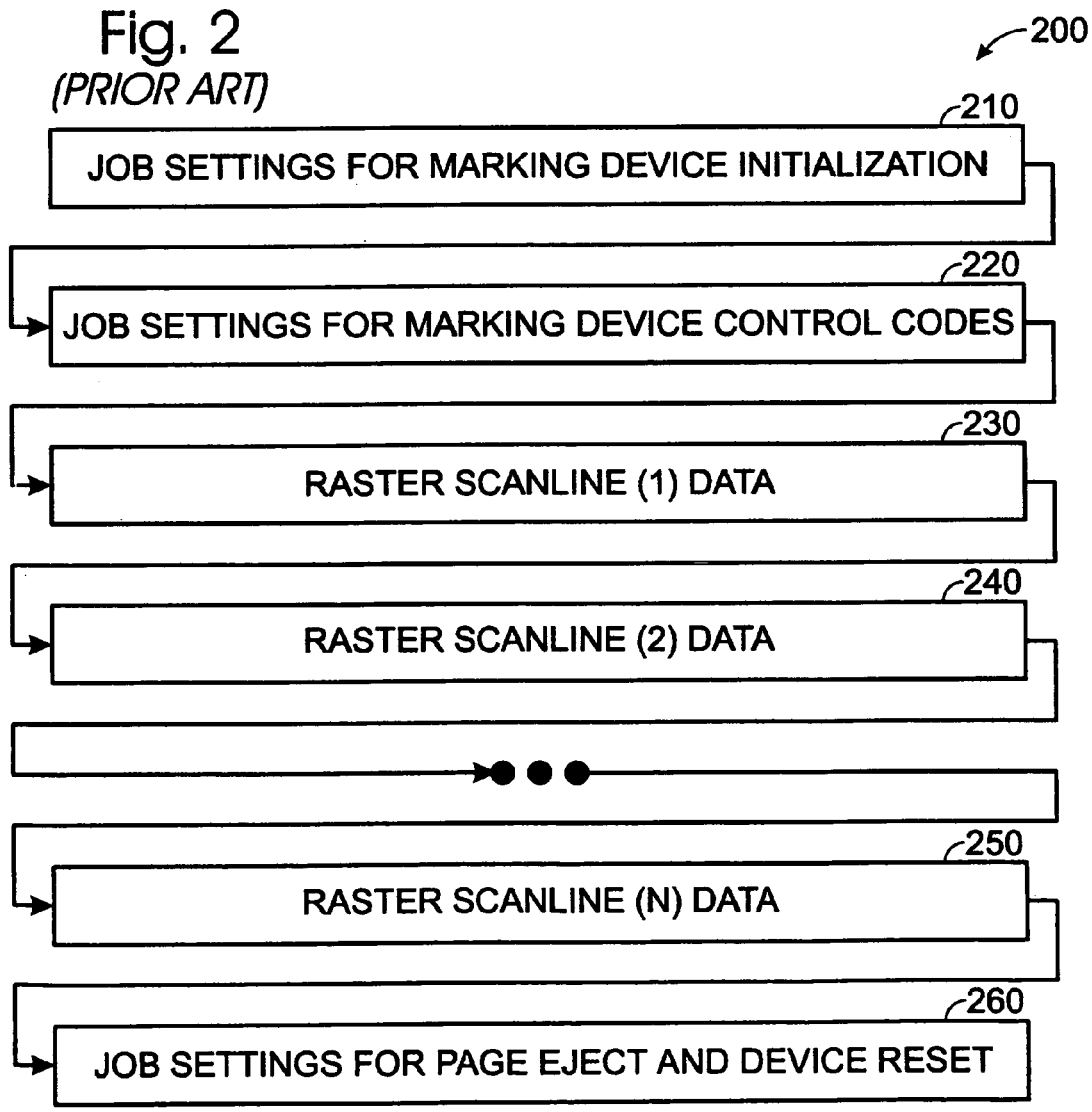
FIG. 2 is a chart for depicting a data format in the prior art, which produces the printing result of the sheet of FIG. 1.
Figure 3:
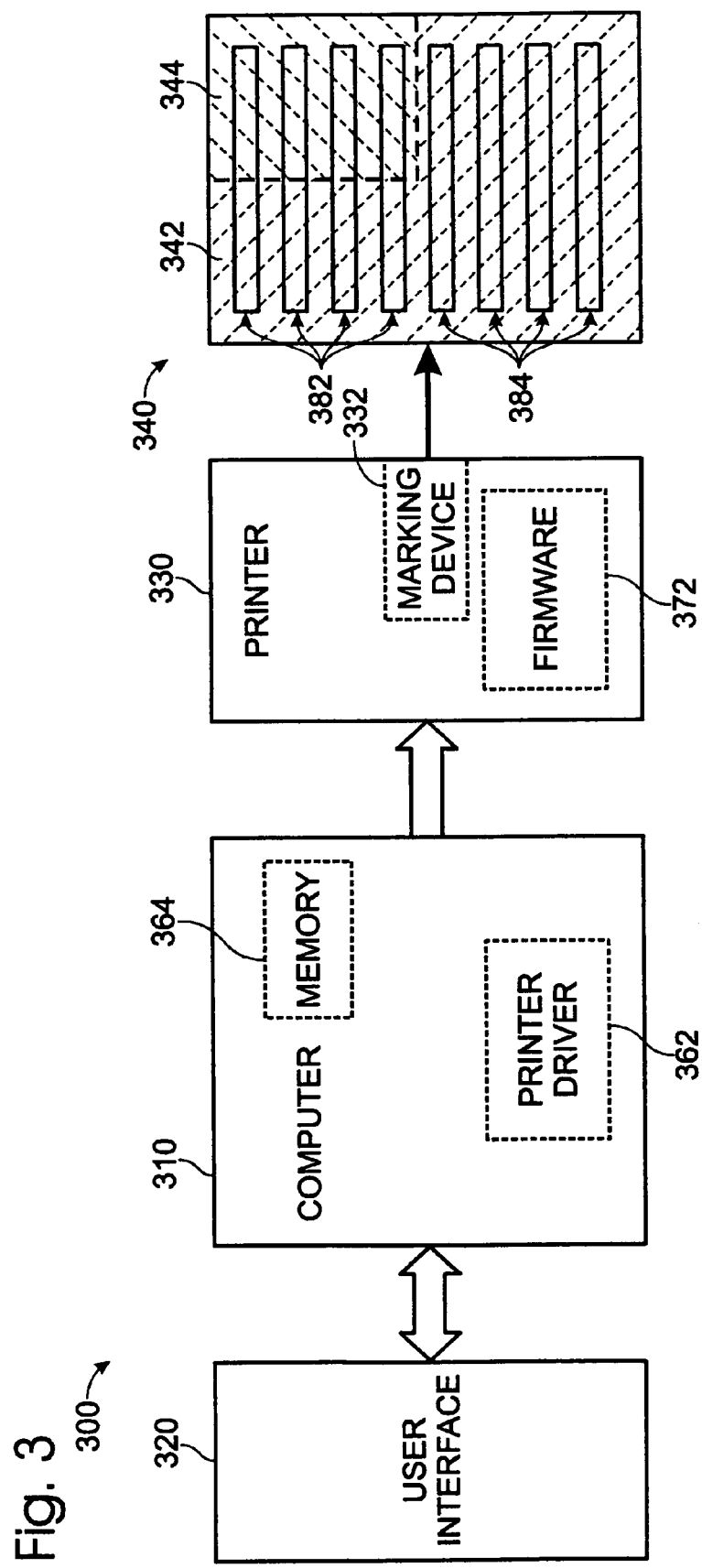
FIG. 3 is a block diagram of a system made according to the present invention and operating according to a method of the invention.

Referring to FIG. 3, a block diagram 300 shows a system made according to the present invention, and operating according to a method of the present invention. A computer 310, such as a personal computer 310, is operated by user (not shown) from a user interface 320. The computer 310 is connected to a printer 330 made according to the present invention. The printer 330 has a marking device 332, with which it can print on pages 340.

A page 340 according to the invention can be a sheet of paper, or other surface suitable for printing text, drawings, photographs, etc. The printing surface need not be made from paper, but can be made from plastic or other equivalent material.

Page 340 a shown as having a first region 342 of a first texture, and a second region 344, of a second texture. That is not necessary, however, and page 340 can be of a homogeneous texture.

The computer 310 has a printer driver 362, and a memory 364. The printer 370 has a firmware 372. Printer driver 362 operates a program stored in memory 364 to operate firmware 372.

The printer driver 362, in combination with the firmware 372, subdivides page 340 into raster scan lines 382, 384. It will be observed that the second raster scan lines 384 span only the first region 342 of the page 340, while the first raster scan lines 382 span both the first region 342 and the second region 344 of the page 340.

The printer driver 362 additionally generates data in a special format according to the invention. The data is sent to the printer 330, for setting the marking device 332 accordingly, and also for printing according to how the marking device 313 has been set.

Figure 4:
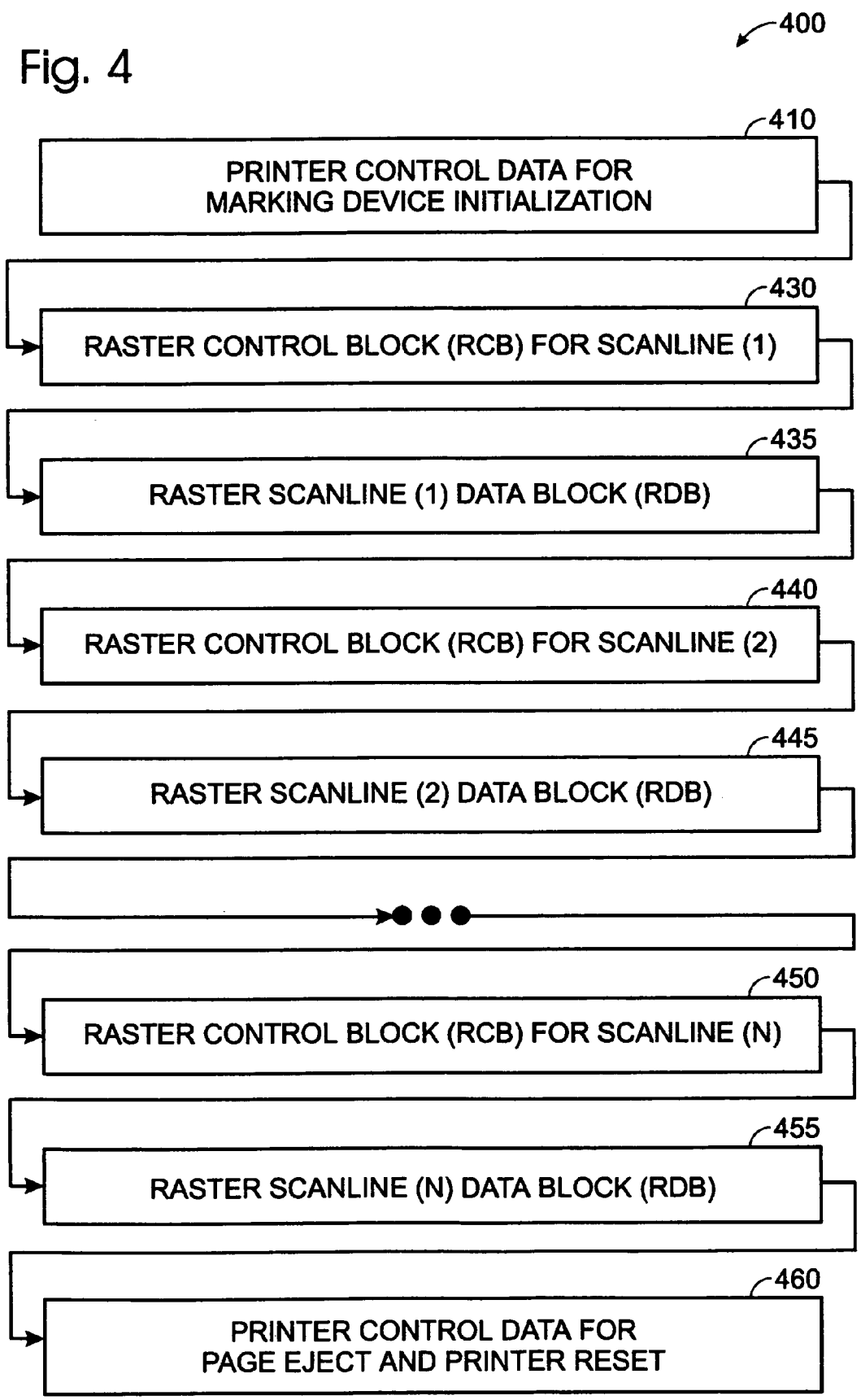
FIG. 4 is a chart for depicting a data format for the system of FIG. 3 according to the invention.

Referring now to FIG. 4, a data format 400 of the invention is described. Data format 400 is for printing on a single page 340, as has been prepared by the printer driver 362 and/or the firmware 372.

A box 410 in the beginning of the data string represents printer control data for initialization of the printer 330 and the marking device 332.

In addition, for each raster scan line there is a corresponding raster scan line data block (RDB). According to the present invention, individual raster scan line data blocks are preceded by corresponding raster control block (RCB) data. One or more of the individual raster scan line data blocks can have its own RCB data.

More particularly, for a first raster scan line (1), a subsequent box 430 represents a raster control block (RCB) of data for raster scan line (1). A following box 435 represents the actual raster scan line data block (RDB) for raster scan line (1).

Similarly, a following box 440 represents the RCB data for a following raster scan line (2), and immediately following box 445 represents the actual RDB data for printing along the raster scan line (2). This data format continues for the raster scan lines that the page 340 has been subdivided into.

For the last raster scan line (N), a box 450 represents the RCB data, and an immediately following box 455 represents the actual RDB data for printing along the last raster scan line (N). After that, a box 460 represents optional data for printer control for ejecting the page 340, and for resetting the printer 330.

In each case, the RDB data is what the printer actually prints out. The RCB data is what sets the marking device of the printer, for printing the corresponding RDB data.

Details are now described of the raster control block data (RCB) and the raster scan line data blocks (RDB). Two embodiments are now described with reference to FIG. 5 and FIG. 6, for the order of printer ready data according to the invention for three scan lines X, Y, Z.

In both cases, scanline X is for employing three different settings of the marking device 332, as may be the case when the scanline X spans three different regions of the page. Similarly, scanline Y is for employing a single setting. Additionally, scanline Z is for employing two different settings of the marking device 332, for different types of printing along the scanline Z.

Referring now particularly to FIG. 5, the first embodiment is described, where the RCB blocks are given first, and the data blocks RDB follow. Specifically, for scanline X, the blocks come in the order RCB-XA, RCB-XB, RCB-XC, RDB-XA, RDB-XB, RDB-XC. For scanline Y, the blocks come in the order RCB-YA, RDB-YA. For scanline Z, the blocks come in the order RCB-ZA, RCB-ZB, RDB-ZA, RDB-ZB. In this case, the raster control block data RCB is largely in the boundaries of the raster scanline data RDB.

Referring now particularly to FIG. 6, the second embodiment is described, where each RDB block follows it corresponding RCB block. Specifically, for scanline X, the blocks come in the order RCB-XA, RDB-XA, RCB-XB, RDB-XB, RCB-XC, RDB-XC. For scanline Y, the blocks come in the order RCB-YA, RDB-YA. For scanline Z, the blocks come in the order RCB-ZA, RDB-ZA, RCB-ZB, RDB-ZB. In this case, the raster control block data RCB is intermingled with the raster scanline data RDB.

The data formats of FIG. 5 and FIG. 6 are the two simplest embodiments for presenting the data according to the invention. Other embodiments can equivalently be employed.

In both cases the RDB data is advantageously compressible. In fact, the first embodiment of FIG. 5 is preferable to the second embodiment of FIG. 6, because it permits even greater compressibility of the RDB data.

A characteristic of the invention is that the marking device 332 of the printer 330 can be reset by raster control block data between printing successive raster scan lines, or even while printing a single raster scan line. This permits fully printing on page 340 with a single pass, even while adapting the settings for different textures in different regions of page 340.

It is readily apparent that, in addition to a computer 310, the present invention can be implemented in logic circuitry, or in a dedicated microcontroller circuit.

The invention additionally provides a method. Preferably the method is implemented by software, in which case the method is implemented either by the printer driver 362, or by the firmware 372, or both.

This detailed description is presented largely in terms of display images, algorithms, and symbolic representations of operations of data bits within a computer readable medium, such as a memory. These algorithmic descriptions and representations are the means used by those skilled in the data processing arts to most effectively convey the substance of their work to others skilled in the art. A person skilled in the art of programming can use this description to readily generate specific instructions for implementing a program according to the present invention.

Often, for the sake of convenience only, it is preferred to implement and describe a program as various interconnected distinct software modules or features, also known as software. This is not necessary, however, and there may be cases where modules are equivalently aggregated into a single program with unclear boundaries.

In any event, the software modules or features of the present invention can be implemented by themselves, or in combination with others. Again, the combination can result in distinct software modules, or ones with blurred boundaries.

An algorithm is here, and generally, a self-consistent sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated. When stored, they can be stored in any computer-readable medium. It is convenient at times, principally for reasons of common usage, to refer to these signals as bits, values, elements, symbols, characters, images, terms, numbers, or the like. It should be borne in mind, however, that all of these and similar terms are associated with the appropriate physical quantities and are merely convenient labels applied to these quantities.

In the present case, the method of the invention is implemented by machine operations. These can be optionally performed in conjunction with a human operator. Useful machines for performing the operations of the present invention include general purpose digital computers or other similar devices. In all cases, there should be borne in mind the distinction between the method of operating a computer and the method of computation itself. The present invention relates to method steps for operating a computer and processing electrical or other physical signals to generate other desired physical signals.

Another aspect of the present invention relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below.

The program can be stored in a computer-readable medium, such as a computer memory, a microprocessor, etc. But it should be clear to a person skilled in the art that the program of the invention need not reside in a single memory, or even a single machine. Various portions, modules or features of it can reside in separate memories, or even separate machines. The separate machines may be connected directly, or through a network, such as a local access network (LAN), or a global network, such as what is presently known as Internet-1. Similarly, the users need not be collocated with each other, but each only with a machine that houses a portion of the program.

Figure 7:
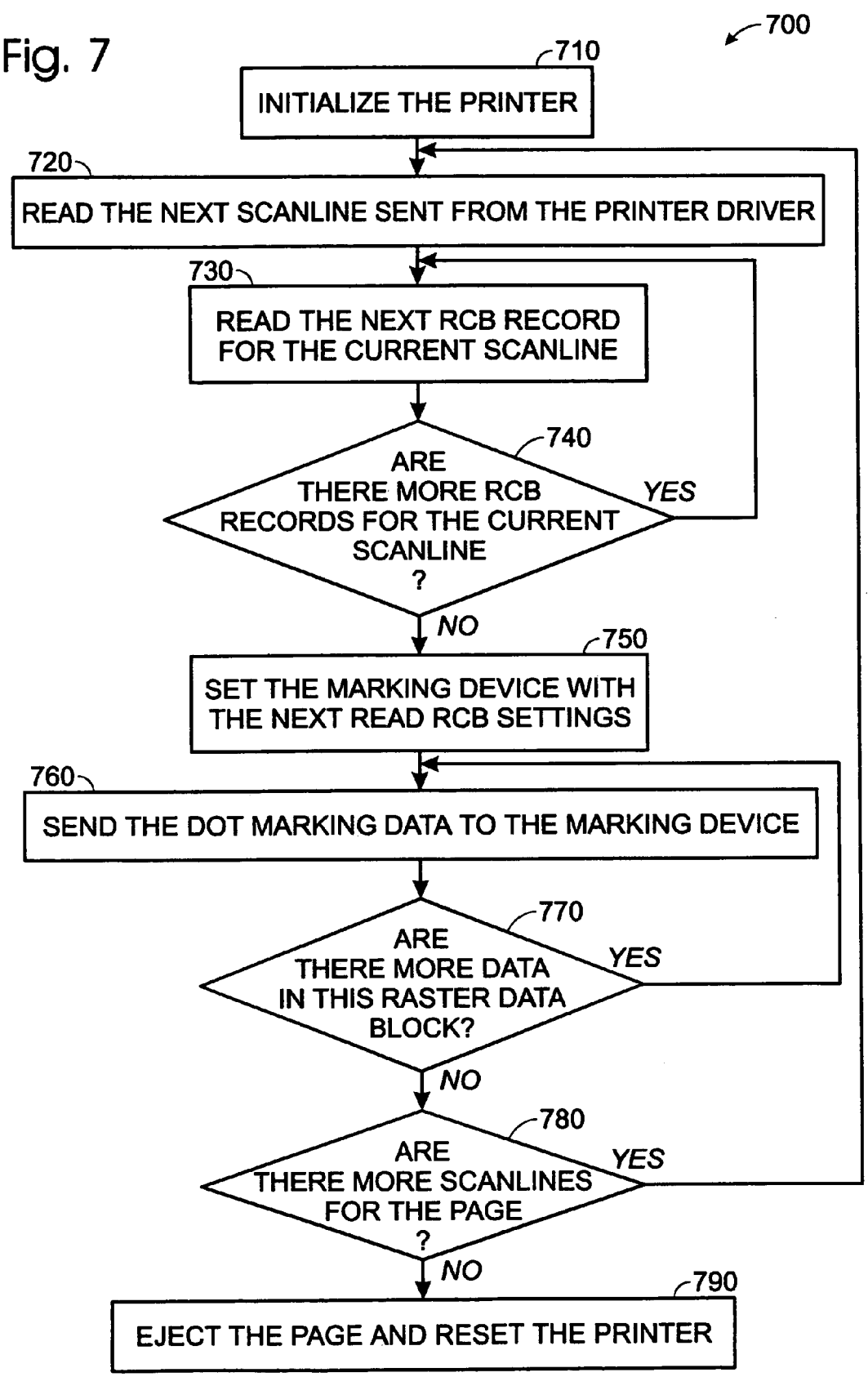
FIG. 7 is a flowchart illustrating a method according to the invention.

Referring now to FIG. 7, the method of the invention is described in more detail. The flowchart 700 is for reading and interpreting data that is formatted according to FIG. 5. It will be apparent to a person skilled in the art that if in different data format is used, such as that of FIG. 6 or an equivalent other, then the flowchart 700 would have to be accordingly modified.

According to a box 710, the printer is initialized.

According to a box 720, the next scanline sent from the printer driver is read.

According to a box 730, the next RCB record for the current scan line is read.

According to a box 740, it is inquired to whether there are more RCB records for the current scanline. If yes, execution returns to box 730.

If not, then according to a box 750, the marking device is set with the next read RCB settings. (The first time box 750 is reached, the first RCB data record for the current scanline is used. The second time box 750 is reached, the second RCB data record for the current scanline is used, and so on.)

According to a next box 760, the dot marking data is sent to the marking device. In other words, the marking device prints according to the RDB data.

According to a next box 770, it is inquired to whether there are more data in this raster data block. If yes, execution returns to box 750.

If not, then according to a box 780, it is inquired whether there are more scanline for this page. If yes, then execution returns to box 720.

If not, then according to a box 790 the page is rejected and the printer is reset. Box 790 is advantageously coordinated with box 710.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

What is claimed is:

1. A method for a printer to print on a page comprising:
defining a plurality of raster scan lines on the page;
then setting a marking device of the printer according to a first raster control block of data;
then the marking device marking on the page according to a first one of the raster scan lines;
then, before reaching a second one of the raster scan lines, resetting the marking device according to a second raster control block of data;
then the marking device marking on the page according to a second raster scan line;
starting to mark on the page according to a third one of the raster scan lines;
then, before reaching a remainder of the third scan line, resetting the marking device according to a third raster control block of data; and
then the marking device marking on the page according to the remainder of the third raster scan line;
where the third raster control block of data is received by the printer while the marking device is marking on the page according to a third one of the raster scan lines.

2. The method of claim 1, further comprising:
receiving a first block of marking data for marking while the marking device is set according to the first raster control block of data; and
receiving a second block of marking data for marking after resetting.

3. The method of claim 1, further comprising:
receiving a first block of marking data for marking while set according to the first raster control block of data; and
receiving a second block of marking data for marking after resetting.

4. The method of claim 1, where the printer receives a control block of data associated with a scan line that the marking device is marking according to.

5. A computer for causing a printer to print on a page inserted in the printer, the computer system comprising a printer driver and a storage medium, wherein the storage medium has stored thereon instructions, that, when executed by the printer driver, result in:
defining a plurality of raster scan lines on the page;
then setting a marking device of the printer according to a first raster control block of data;
then the marking device marking on the page according to a first one of the raster scan lines;

then, before reaching a second one of the raster scan lines, resetting the marking device according to a second raster control block of data; and then the marking device marking on the page according to the second raster scan line;

starting to mark on the page according to a third one of the raster scan lines;

then, before reaching a remainder of the third scan line, resetting the marking device according to a third raster control block of data; and then the marking device marking on the page according to the remainder of the third raster scan line;

where the third raster control block of data is received by the printer while the marking device is marking on the page according to a third one of the raster scan lines.

6. The computer of claim 5, wherein the instructions, when executed by the printer driver, further result in:

receiving a first block of marking data for marking while the marking device is set according to the first raster control block of data; and receiving a second block of marking data for marking after resetting.

7. The computer of claim 5, wherein the instructions, when executed by the printer driver, further result in:

receiving a first block of marking data for marking while set according to the first raster control block of data; and receiving a second block of marking data for marking after resetting.

\* \* \* \* \*